United States Patent
Huang et al.

(10) Patent No.: US 9,888,593 B2
(45) Date of Patent: Feb. 6, 2018

(54) BACK PLATE OF CURVED DISPLAY DEVICE AND CURVED DISPLAY DEVICE USING SAME

(71) Applicant: AU OPTRONICS CORPORATION, Hsin-chu (TW)

(72) Inventors: Chi-Chen Huang, Hsin-chu (TW); Ren-Mei Tseng, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/284,965

(22) Filed: Oct. 4, 2016

(65) Prior Publication Data

US 2017/0171998 A1    Jun. 15, 2017

(30) Foreign Application Priority Data

Dec. 11, 2015  (TW) .............................. 104141765 A (51) Int. Cl.
| | |
|---|---|
| *H05K 5/02* | (2006.01) |
| *H05K 5/00* | (2006.01) |
| *G02F 1/1333* | (2006.01) |
| *H04N 5/64* | (2006.01) |

(52) U.S. Cl.
CPC ............. *H05K 5/02* (2013.01); *G02F 1/1333* (2013.01); *H04N 5/64* (2013.01); *H05K 5/0017* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,865,033 B2 * | 3/2005 | Laverty | ................. | G02B 27/06 359/619 |
| 7,484,325 B2 * | 2/2009 | Benedict | ............. | G09F 15/0025 40/606.12 |
| 8,797,722 B2 * | 8/2014 | He | .......................... | H05K 5/02 248/124.1 |
| 8,982,545 B2 * | 3/2015 | Kim | ..................... | B32B 17/064 174/255 |
| 9,366,802 B2 * | 6/2016 | Lee | ..................... | G02B 6/0081 |

(Continued)

FOREIGN PATENT DOCUMENTS

| | | |
|---|---|---|
| CN | 101513781 A | 8/2009 |
| CN | 101915999 A | 12/2010 |

(Continued)

OTHER PUBLICATIONS

Office Action and Search Report issued by the State Intellectual Property Office of the Peoples Republic of China dated Nov. 24, 2017 for Application No. CN 201610076204.2, China.

*Primary Examiner* — Lisa Lea Edmonds
(74) *Attorney, Agent, or Firm* — Tim Tingkang Xia, Esq.; Locke Lord LLP (57) ABSTRACT

A back plate of a curved display device of the present invention includes a first plate, a second plate, and a plurality of spacer units. The first plate has a first periphery, and the second plate has a second periphery. The second periphery is disposed on the first plate, forming an interlayer space therebetween. The first periphery is fastened to the second periphery. The first plate and the second plate are curved corresponding to each other. The spacer units are distributed in the interlayer space and are connected to the first plate and the second plate.

8 Claims, 8 Drawing Sheets

(56) References Cited

U.S. PATENT DOCUMENTS

| | | | |
|---|---|---|---|
| 9,572,268 B2* | 2/2017 | Yamazaki | G09G 3/32 |
| 2005/0105259 A1* | 5/2005 | Lee | G06F 1/1601 |
| | | | 361/679.21 |
| 2010/0289996 A1* | 11/2010 | Wang | G02F 1/13394 |
| | | | 349/155 |
| 2011/0102709 A1 | 5/2011 | Lan et al. | |
| 2011/0228190 A1* | 9/2011 | Yang | G02F 1/13394 |
| | | | 349/56 |
| 2012/0186120 A1* | 7/2012 | Suciu | G09F 15/0037 |
| | | | 40/606.12 |
| 2015/0185761 A1* | 7/2015 | Song | G06F 1/1601 |
| | | | 361/679.21 |
| 2015/0277131 A1* | 10/2015 | Park | G02B 27/2221 |
| | | | 349/58 |

FOREIGN PATENT DOCUMENTS

| | | |
|---|---|---|
| CN | 104317076 A | 1/2015 |
| CN | 204117507 U | 1/2015 |
| TW | M1497794 U | 3/2015 |
| TW | 201533501 A | 9/2015 |

\* cited by examiner

BACK PLATE OF CURVED DISPLAY DEVICE AND CURVED DISPLAY DEVICE USING SAME

CROSS-REFERENCE TO RELATED APPLICATION

This non-provisional application claims priority to and benefit of, under 35 U.S.C. § 119(a), Patent Application No. 104141765 filed in Taiwan R.O.C. on Dec. 11, 2015, the entire content of which is hereby incorporated by reference.

TECHNICAL FIELD

The present invention relates to a display device and a display-device back plate, and more particularly to a curved display device and a curved back plate.

BACKGROUND

With the development of display technologies, not only the dimension and the display quality of display devices have been improved, but also the appearance of display devices have been changed, for example, curved display devices. Compared with a planar display device, a curved display device having a same width can be fabricated into a larger dimension, and can provide a better viewing effect. For example, the screen of a television can be fabricated to be inwardly concave, so that when the user watches the television, the differences between the distances from the eyes to different positions on the screen are smaller than those of a planar television, and the line of sight is perpendicular or nearly perpendicular to all parts of the television, which is the best viewing angle.

Figure 1:
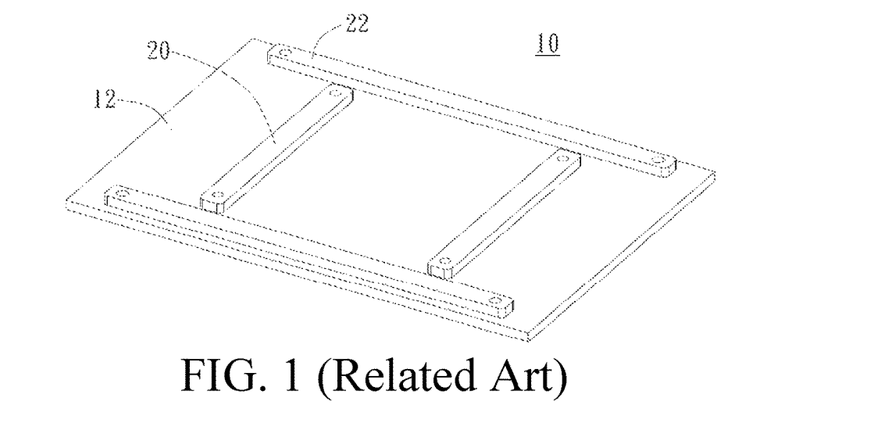
FIG. 1 is a schematic view of a conventional curved display device.

As shown in FIG. 1, to maintain the curved structure of a conventional curved display device 10, usually vertical supports 20 and transverse supports 22 are fastened to a rear side 12 (i.e., the surface opposite to the display surface) of the curved display device 10 to restrain the curved display device 10 so as to maintain curvature of the display device and reduce the amount of deformation of the display device. However, as curved display devices are developing towards thinner structures, the thicknesses of the vertical supports 20 and the transverse supports 22 need to be reduced. As a result, the ability of these supports to reduce the amount of deformation is lowered. In addition, as curved display devices become thinner, it is difficult to control the curvature of the back plate, and the display is prone to light leakage caused by compression. Therefore, the structure of the conventional curved display device needs to be improved.

SUMMARY

One objective of the present invention is to provide a curved display device, so as to improve the structural stability of the curved display device and reduce the amount of deformation.

Another object of the present invention is to provide a curved display device, which can reduce the overall module thickness.

The curved display device includes a curved display panel and a curved back plate. The curved back plate includes a first plate, a second plate, and a plurality of spacer units. The first plate has a first periphery, and the second plate has a second periphery. The second plate is disposed on the first plate, forming an interlayer space therebetween. The curved display panel is disposed on an outer side of the first plate and is supported by the first plate. The first periphery is fastened to the second periphery. The first plate and the second plate are curved corresponding to each other. The spacer units are distributed in the interlayer space and are connected to the first plate and the second plate.

In the curved back plate of the present invention, the combination of the first plate, the second plate and the spacer units is used to improve the overall rigidity, thereby avoiding the problem of poor structural stability caused when the display device becomes thinner.

DETAILED DESCRIPTION

The present invention provides a curved display device, and a curved display panel and curved back plate for use therein. The curved display panel may be a self-emission or non-self-emission display panel, for example, an organic light-emitting diode display panel or a liquid crystal display panel.

Figure 2A:
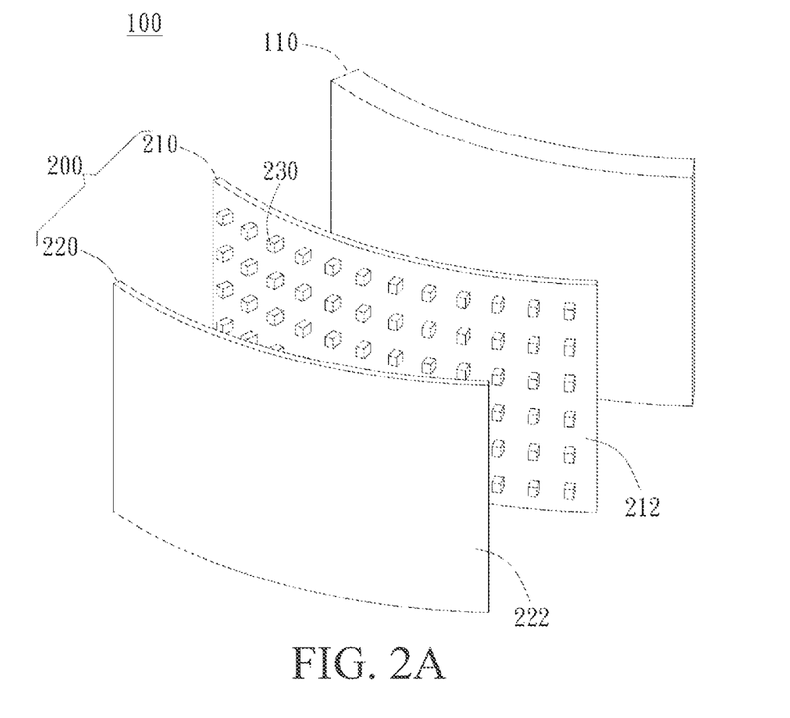
FIG. 2A is an exploded view of an embodiment of a curved display device according to the present invention.

FIG. 2A is an exploded view of an embodiment of a curved display device 100 according to the present invention. As shown in FIG. 2A, the curved display device 100 includes a curved display panel 110 and a curved back plate 200. The curved back plate 200 includes a first plate 210, a second plate 220, and a plurality of spacer units 230. The first plate 210 has a first periphery 212, i.e., a region adjacent to boundary edges of the first plate 210. Similarly, the second plate 220 has a second periphery 222. As shown in FIG. 2A, the first plate 210 and the second plate 220 are curved corresponding to each other, and jointly form the curved back plate 200. In addition, the spacer units 230 are distributed between the first plate 210 and the second plate 220 to separate the first plate 210 from the second plate 220 by a distance h (referring to FIG. 2B). The curved display panel 110 is disposed on an outer side of the first plate 210 (i.e., the side of the first plate 210 facing away from the second plate 220) and is supported by the first plate 210.

Figure 2B:
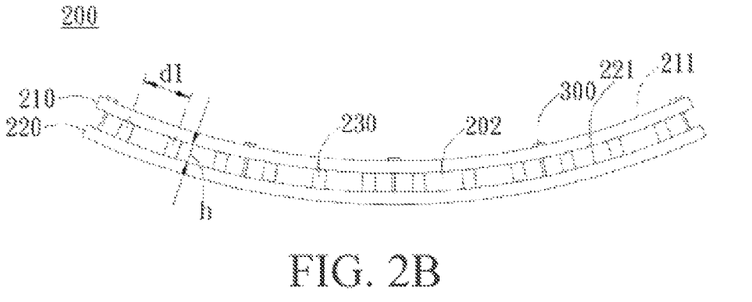
FIG. 2B is a top view of an embodiment of a curved back plate.

FIG. 2B is a top view of an embodiment of the curved back plate 200. As shown in FIG. 2B, the first plate 210 is curved convexly with respect to the second plate 220, and the second plate 220 is curved concavely with respect to the first plate 210. The first plate 210 and the second plate 220 are preferably preformed, so that the first plate 210 and the second plate 220 both have a bending pre-stress. For example, a mold is made according to a desired curvature, the first plate 210 and the second plate 220 are respectively preformed into a curved shape by using the mold, and then the first plate 210 and the second plate 220 are assembled. Therefore, the first plate 210 and the second plate 220 are still curved before assembly or after disassembly, which can reduce the amount of spring back of the curved back plate 200 and improve the stability during installation. In other embodiments, the first plate 210 and the second plate 220 may not be preformed, for example, at least one of the first plate 210 and the second plate 220 is planar before assembly, and the two are secured by using a jig and then assembled together by fastening the first plate 210 to the second plate 220, thereby saving the cost of the performing mold.

As shown in FIG. 2B, the second plate 220 is disposed on the first plate 210, forming an interlayer space 202 therebetween. The abovementioned spacer units 230 are distributed in the interlayer space 202 and are connected to the first plate 210 and the second plate 220. Thereby, the spacer units 230 can be used to separate the first plate 210 from the second plate 220 by a distance h, so that the spacer units 230 are located between the first plate 210 and the second plate 220 to maintain the height of the interlayer space 202, i.e., the first plate 210 and the second plate 220 are separated from each other by the distance h by means of the spacer units 230. For example, the spacer units 230 are a plurality of bumps extending from the first plate 210 and protruding towards the second plate 220. The top end of each of the bumps is connected to a surface 221 of the second plate 220, preferably by riveting or adhesion, so as to transfer a shearing force between the first plate 210 and the second plate 220, thereby improving the resistance to bending deformation. In other embodiments, each of the bumps may be simply in contact with the surface 221 of the second plate 220 as required, and the bump urges against the second plate 220 so that the first plate 210 and the second plate 220 are not in contact with each other. It should be noted that the spacer units 230 are not limited to being formed on the first plate 210, and may be selectively formed on the second plate 220. In other words, the spacer units 230 may be selectively formed on the plate that directly supports the curved display panel (e.g., the first plate 210 in this embodiment) or formed on the plate that does not directly support the curved display panel (e.g., the second plate 220 in this embodiment).

Figure 2C:
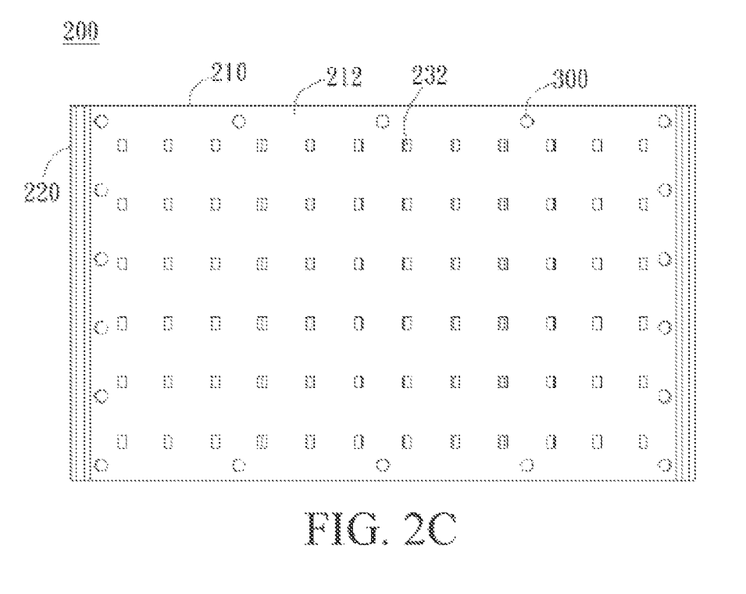
FIG. 2C is a front view of an embodiment of a curved back plate.

FIG. 2C is a front view of the curved back plate 200 when viewed from a concave surface 211 of the first plate 210 (referring to FIG. 2B). As shown in FIG. 2C, the first plate 210 and the second plate 220 are assembled to form the curved back plate 200. A plurality of notches 232 is formed on the concave surface 211 of the first plate 210 and protrudes out of the second plate 220, thus forming the abovementioned bumps. In addition, a fastening unit 300 is disposed between the first periphery 212 and the second periphery (not shown, located behind the first plate), and the first plate 210 is fastened to the second plate 220 by using the fastening unit 300. The fastening method may be screw fastening, riveting, or adhesion, but is not limited thereto. By means of fastening, the tightness between the first plate 210 and the second plate 220 is improved, thereby improving the strength and distortion resistance of the curved back plate 200.

Figure 2D:
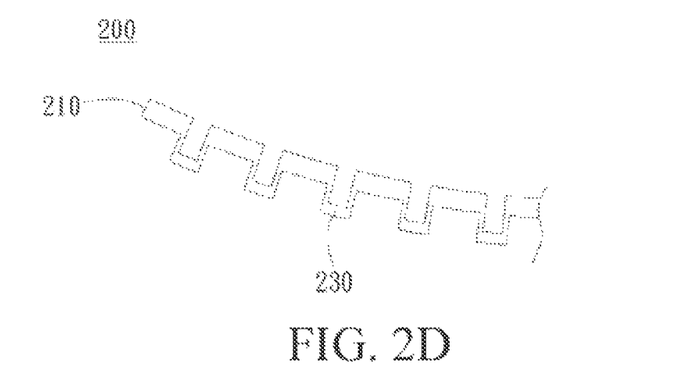
FIG. 2D is a cross-sectional view of an embodiment of a curved back plate taken along spacer units.
Figure 3:
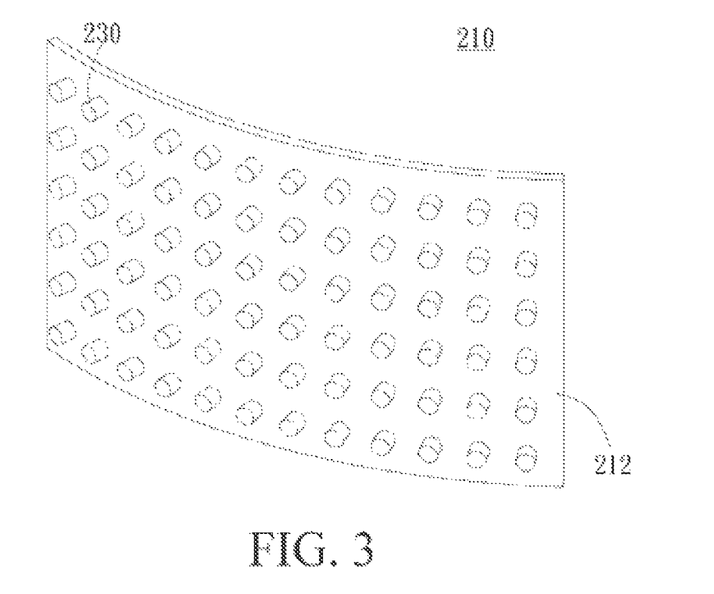
FIG. 3 is a three-dimensional view of another embodiment of a first plate.

FIG. 2D is a cross-sectional view of an embodiment of the curved back plate taken along the spacer units. As shown in FIG. 2D, a plurality of spacer units 230 is formed on the convex surface of the first plate 210. The spacer units 230 may be formed by punching. In addition, the shape of the spacer units can be adjusted for the convenience of manufacturing. FIG. 3 shows another embodiment of the first plate. As shown in FIG. 3, the spacer units 230 on the first plate 210 may have a cylindrical structure. Correspondingly, circular notches are formed on the concave surface of the first plate 210, which will not be described in detail herein.

Further, the first periphery 212 is fastened to the second periphery 222, and the abovementioned spacer units 230 are used between the first plate 210 and the second plate 220, which can further reduce the amount of deformation of the curved back plate. In an actual test for a curved back plate having a dimension of, for example, 65 inches (16:9), a 0.6 mm thick first plate 210 and a 0.6 mm thick second plate 220 are used, the first plate 210 is fastened to the second plate 220 by soldering, an external force is applied to a corner perpendicularly to the plate surface of the curved back plate (where the measured external force is 49 N), and the amount of structural deformation at a corner is observed. The measurement result indicates that when the peripheries are soldered together after stacking the first plate 210 and the second plate 220 on each other and there is no bump serving as the spacer unit 230, the maximum amount of structural deformation is 433.7 mm. In contrast, when the peripheries of the first plate 210 and the second plate 220 are soldered together and there are 3 mm high bumps serving as the spacer units 230, the maximum amount of structural deformation is 90.1 mm. Through comparison between the amount of structural deformation in the case where only the first plate 210 and the second plate 220 are soldered together and the amount of structural deformation in the case where the first plate 210 and the second plate 220 are soldered together and there are bumps serving as the spacer units 230, it is found that the use of the spacer units 230 significantly reduces the structural deformation. Therefore, fastening and the use of the spacer units 230 significantly improves the deformation resistance of the curved back plate 200. Moreover, the fastening of the first periphery 212 to the second periphery 222 also prevents the first plate 210 and the second plate 220 from undesirable distortion under a force, thereby maintaining the overall curved shape.

Figure 4:
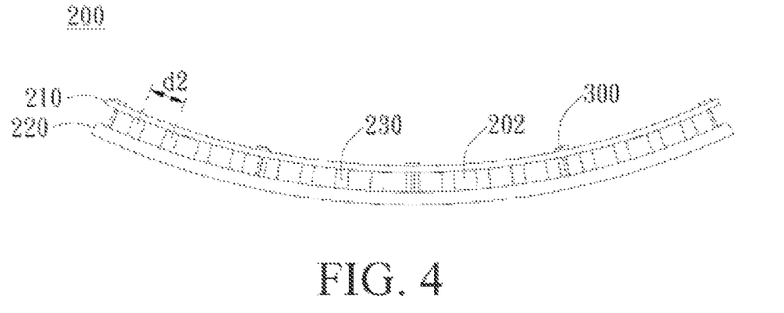
FIG. 4 is a top view of an embodiment of a curved back plate having different thicknesses.

In the foregoing embodiments, the first plate 210 and the second plate 220 has a same thickness; however, in different embodiments, the first plate 210 and the second plate 220 may be further thinned to different thicknesses. FIG. 4 is a top view of an embodiment of a curved back plate 200 having different thicknesses. As shown in FIG. 4, the first plate 210 is thinner than the second plate 220 so as to reduce the overall thickness of the curved back plate 200. In addition, referring to FIG. 4 and FIG. 2B, the pitches between different neighboring spacer units 230 are different. It should be noted that the pitch preferably refers to the distance from the center of one spacer unit 230 to the center of a neighboring spacer unit 230 on the first plate 210 before the curved shape is formed. In other embodiments, the spacer units 230 may be formed on the curved first plate according to the curvature, in which case the pitch refers to the distance between the centers of two neighboring spacer units 230 along the curved surface of the first plate 210. In FIG. 2B, neighboring spacer units 230 are spaced apart by a pitch d1, while in FIG. 4, neighboring spacer units 230 are spaced apart by a pitch d2, where the pitch d2 is smaller than the pitch d1. In other words, the pitch between the spacer units 230 can be adjusted as the plate thickness changes. For example, when the thickness of the first plate 210 (or the second plate 220) decreases, the pitch between spacer units is reduced. Thereby, the rigidity of the thin curved back plate is improved, and the amount of deformation of the curved back plate is reduced. It will be appreciated that the above-mentioned pitch includes a horizontal distance and a vertical distance. For the convenience of illustration in the drawings, only the horizontal pitch is shown. In this embodiment, although the first plate 210 is thinner than the second plate 220, the structural stability can be ensured while meeting the thickness requirements because the second plate 220 disposed on the outer side of the first plate 210 can support the first plate 210.

Figure 5A:
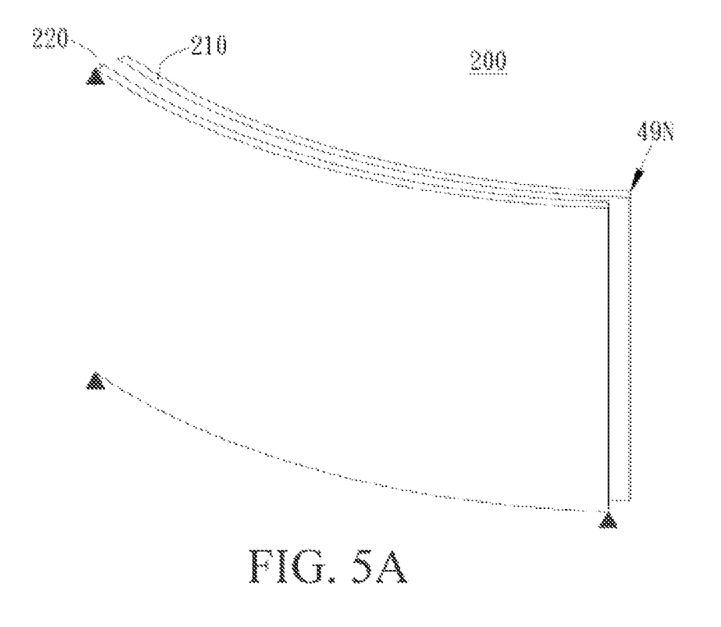
FIG. 5A is a schematic view of measuring a force received by a curved back plate.
Figure 5B:
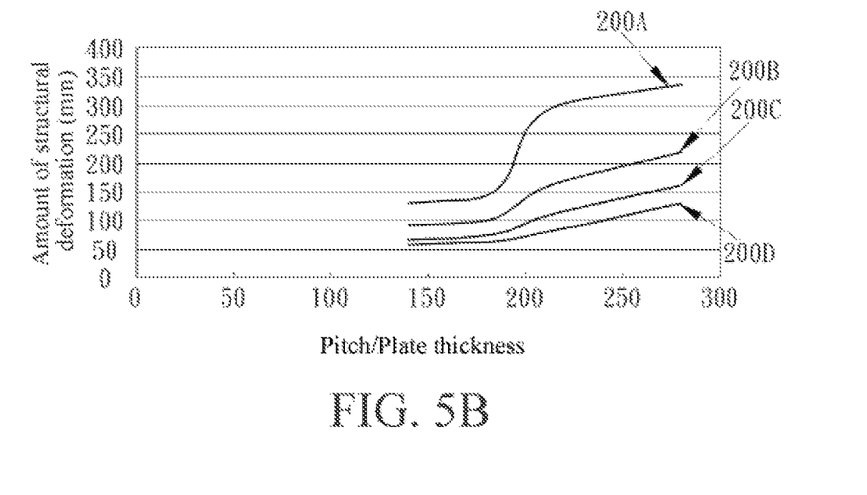
FIG. 5B is a graph illustrating the relationship between the pitch of the spacer units and the amount of structural deformation.

FIG. 5A is a schematic view of measuring a force received by the curved back plate. As shown in FIG. 5A, a 0.6 mm first plate 210 and a 0.6 mm second plate 220 are used, and a multiple of the thickness is used as the pitch between the spacer units 230 (for example, when the thicknesses of the first plate and the second plate are both 0.6 mm, the pitch is 150 times the thickness, that is, the pitch is 90 mm). The force receiving condition is that three corners are fixed (as shown by triangular marks in the figure), and one corner receives an external force perpendicular to the panel (where the measured external force is 49 N). FIG. 5B is a graph illustrating the relationship between the pitch between spacer units and the amount of structural deformation according to an embodiment. In FIG. 5B, the transverse axis is pitch/curved back plate thickness (the pitch divided by the curved back plate thickness), representing that the pitch between spacer units is how many times the thickness of the first plate (or the second plate); the longitudinal axis is the amount of structural deformation, representing the maximum amount of deformation of the overall structure of the curved back plate. Curves in the figure represent curved back plates of different dimensions, which are 85 inches (200A), 65 inches (200B), 55 inches (200C), and 50 inches (200D) respectively. The variation of the curve represents the relationship between different pitches and the amount of structural deformation under an external force. As shown in FIG. 5B, in an actual test, when the pitch is smaller than 210 times the plate thickness, a significant deformation-resisting effect is achieved. In particular, when the first plate and the second plate have a same thickness, the distance between neighboring spacer units is preferably not greater than 210 times the thickness of the first plate or the second plate. When the first plate and the second plate have different thicknesses, the distance between neighboring spacer units is preferably not greater than 210 times the thickness of the thinner one of the first plate and the second plate.

Figure 6:
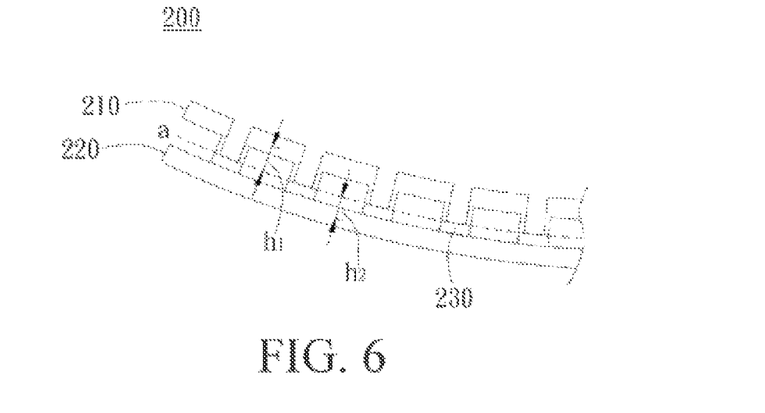
FIG. 6 is a schematic view illustrating the relationship between a curved back plate and a neutral axis.
Figure 7A:
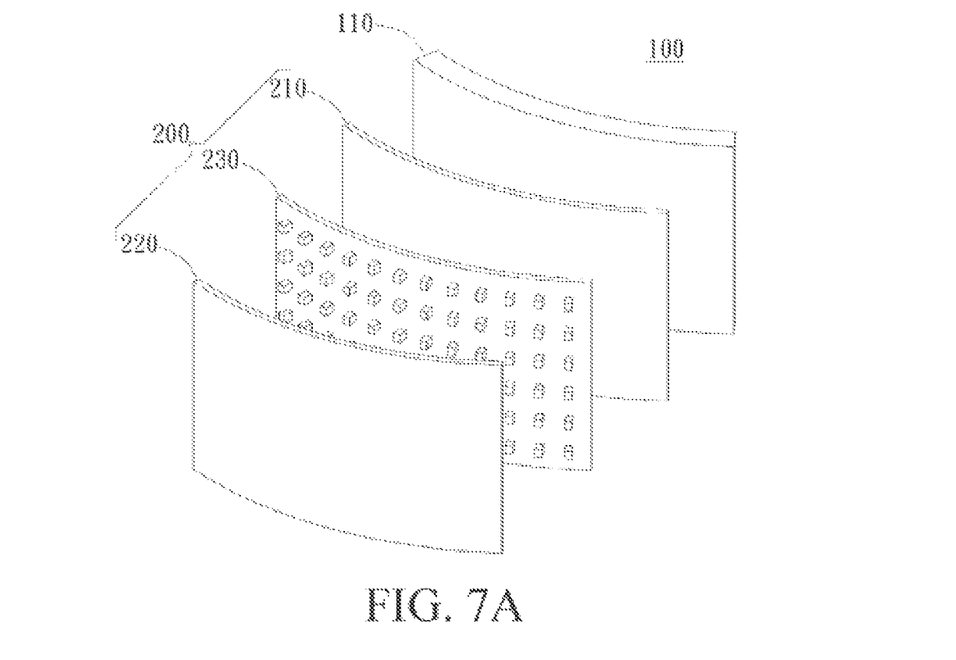
FIG. 7A is an exploded view of an embodiment in which spacer units, a first plate, and a second plate form a composite plate.
Figure 7B:
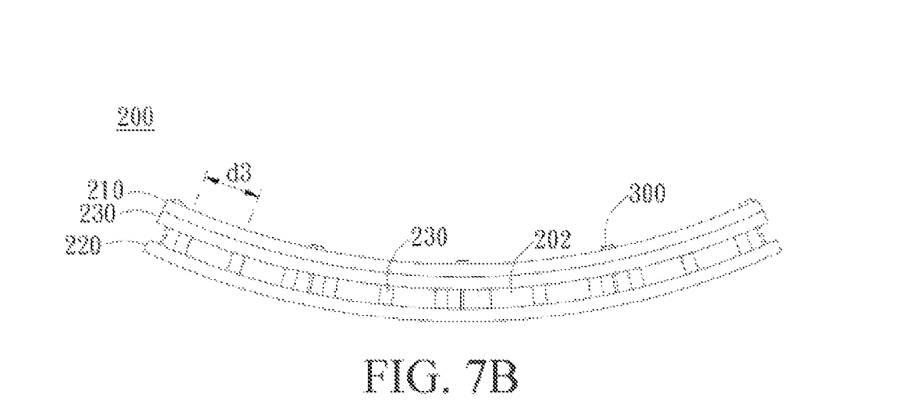
FIG. 7B is a top assembled view of the composite plate of FIG. 7A.

FIG. 6 is a schematic view illustrating the relationship between a curved back plate and a neutral axis. As shown in FIG. 6, the curved back plate 200 has a neutral axis a between the first plate 210 and the second plate 220. The first plate 210 is spaced apart from the neutral axis a by a distance $h_1$, and the second plate 220 is spaced apart from the neutral axis a by a distance $h_2$. The overall structure has a moment of inertia: $I \approx A_1(h_1^2/2) + A_2(h_2^2/2)$, where $h_1$ represents the distance from the midpoint of the thickness of the first plate 210 to the neutral axis a, $h_2$ represents the distance from the midpoint of the thickness of the second plate 220 to the neutral axis a, $A_1$ represents the area of the first plate 210 along the cross-section (not including the protruding part), and $A_2$ represents the area of the second plate 220 along the cross-section. In terms of material, if the first plate 210 and the second plate 220 have a same thickness, the first plate 210 and the second plate 220 are preferably made of a same material; in this way, the neutral axis a of the curved back plate 200 is in the middle, and the curved back plate 200 has a maximum moment of inertia, thereby improving the rigidity of the curved back plate 200. The material of the first plate 210 and the second plate 220 may be, for example, metal or plastic. To provide improved rigidity as described above, using a material with a high Young's modulus can increase the moment of inertia of the curved back plate 200, providing a better deformation-resisting effect. Using a plastic material can reduce the overall weight of the curved back plate 200. Considering machining on the plate, for example, the formation of bumps on the first plate 210 as described above, a metal material is preferably used, which is easy to machine. In addition, a hybrid combination may be used, i.e., the two plates are made of different materials; in this case, preferably the unmachined plate (e.g., the second plate 220) is made of a metal material. Because the unmachined plate does not have the problem of uneven internal stress, using a metal material can ensure the overall rigidity of the curved back plate 200 against deformation. FIG. 7A is an exploded view of an embodiment in which the spacer units 230, the first plate 210, and the second plate 220 form a composite plate. As shown in FIG. 7A, the curved display device 100 includes a curved display panel 110 and a curved back plate 200. The curved back plate 200 includes a first plate 210, a second plate 220, and independent spacer units 230. FIG. 7B is a top assembled view of the composite plate of FIG. 7A. As shown in FIG. 7B, the spacer units 230 are made on a plate that is independent of the first plate 210 and the second plate 220, and then two ends of the spacer units 230 are fastened to the first plate 210 and the second plate 220 respectively, so as to form a three-layer composite structure consisting of the first plate 210, the second plate 220, and the spacer units 230 therebetween. In this embodiment, both the first plate 210 and the second plate 220 are intact unmachined plates, so that the strength of the curved back plate 200 can be further improved. With the use of the structure shown in FIG. 7A and FIG. 7B, the pitch d3 between the spacer units 230 can be increased to be greater than the pitch d1 or the pitch d2 described above. In other words, as the structure of the curved back plate 200 changes, the pitch between the spacer units 230 is not limited to being 210 times the plate thickness as described above, but can be increased depending on the strength of the overall structure.

Figure 8A:
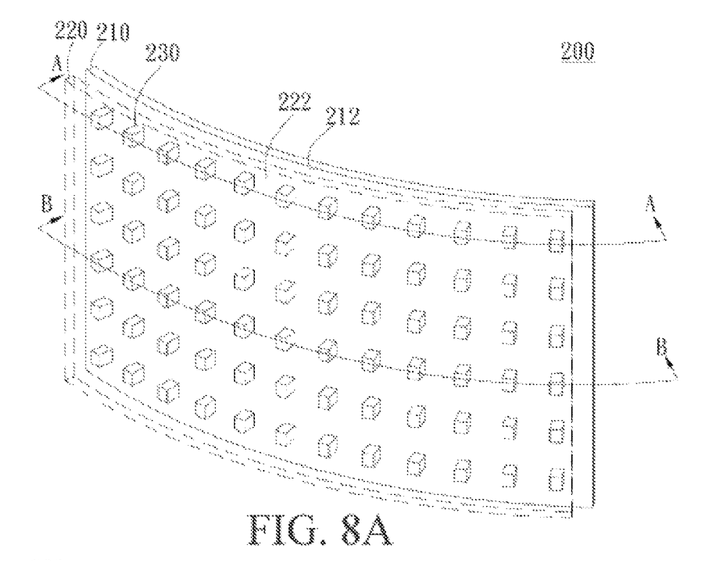
FIG. 8A is a three-dimensional view of another embodiment of a curved back plate according to the present invention.
Figure 8B:
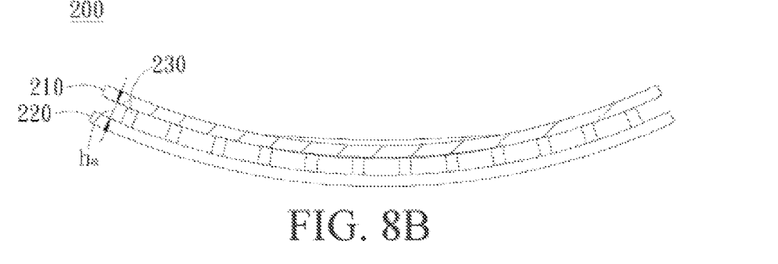
FIG. 8B and FIG. 8C are cross-sectional views of different positions of a curved back plate.
Figure 8C:
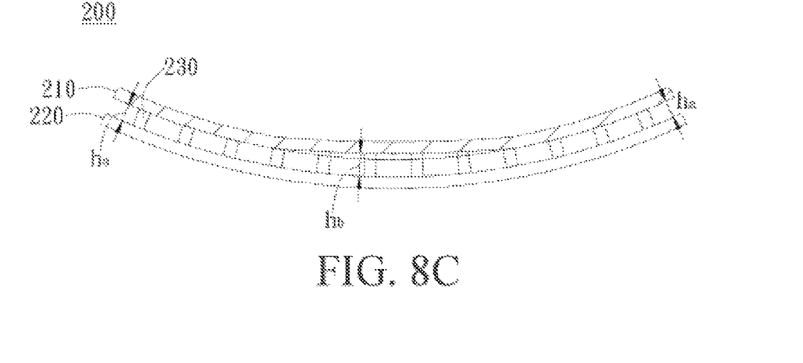

FIG. 8A is a three-dimensional view of another embodiment of the curved back plate 200 according to the present invention. As shown in FIG. 8A, the curved back plate 200 includes a first plate 210 and a second plate 220 (where the second plate 220 is denoted by a dashed-line block for the convenience of describing changes in the first plate 210 and the spacer units 230 behind the second plate 220 with reference to FIG. 8B and FIG. 8C), and spacer units 230 are provided between the first plate 210 and the second plate 220. This embodiment is different from the foregoing embodiments in that the first plate 210 protruding towards the second plate 220 has different degrees of curvature. The first plate 210 has a high degree of curvature at the first periphery 212 adjacent to the boundary of the first plate 210, and the degree of curvature becomes increasingly small in the direction from the first periphery 212 to the center region of the first plate 210. Refer to FIG. 8B and FIG. 8C. FIG. 8B is a cross-sectional view of the curved back plate 200 taken along a line A-A (referring to FIG. 8A, the line A-A is at a position approximately corresponding to upper boundaries of the first plate 210 and the second plate 220). FIG. 8C is a cross-sectional view of the curved back plate 200 taken along a line B-B (referring to FIG. 8A, the line B-B is at a position approximately corresponding to half the height of the first plate 210 and the second plate 220 and spans the peripheries on two sides and the center region).

As shown in FIG. 8B, the interlayer space between the first plate 210 and the second plate 220 has a height $h_a$, and the height of the interlayer space remains the same at positions near the first periphery. In contrast, as shown in FIG. 8C, the interlayer space between the first plate 210 and the second plate 220 has a height $h_a$ at positions adjacent to the first periphery on two sides, and as the degree of curvature of the first plate 210 decreases towards the center region, the distance between the first plate 210 and the second plate 220 increases, and the interlayer space has a height $h_b$ at the position corresponding to the greatest distance (at the center of the first plate 210). In other words, the height of the interlayer space is greater at the center of the first plate 210 than at the first periphery. This gives the user a feeling that the curved back plate 200 is thin at its edges, and such a design in which the thickness of the curved back plate 200 is greater at the center can increase the moment of inertia of the overall structure, thereby improving the structural strength. Moreover, the curved back plate 200 may also be curved to have a varying curvature in other manners as required, for example, a manner in which the curved back plate 200 has a greater thickness at the edges than at the center (i.e., the interlayer space is larger at the first periphery than at the center). Because the method of increasing the thickness at edges covers a large area, the moment of inertia of the overall structure can be increased as the thickness of the module at four edges increases, so that the strength of the overall structure of the curved back plate 200 can be further improved.

Figure 9A:
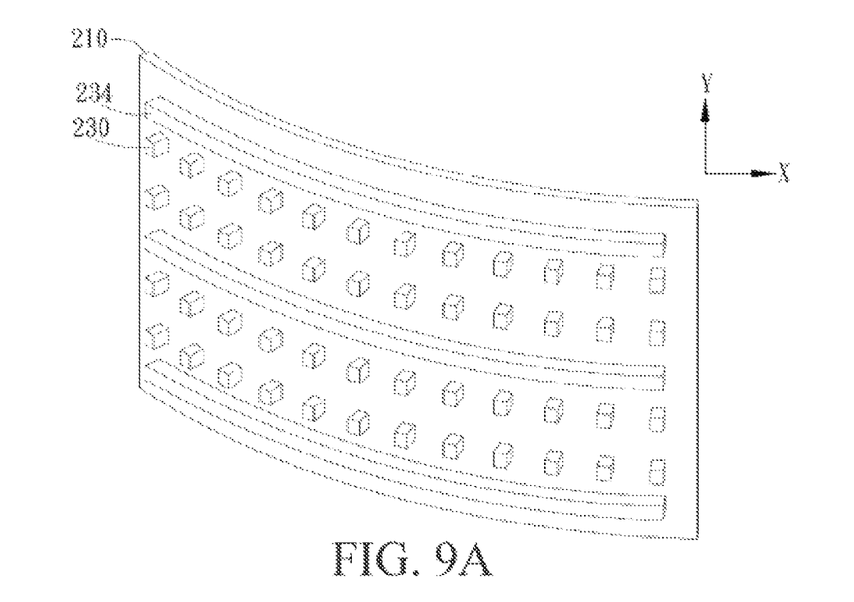
FIG. 9A and FIG. 9B are three-dimensional views of formation of spacer units and ribs on a curved back plate according to different embodiments.
Figure 9B:
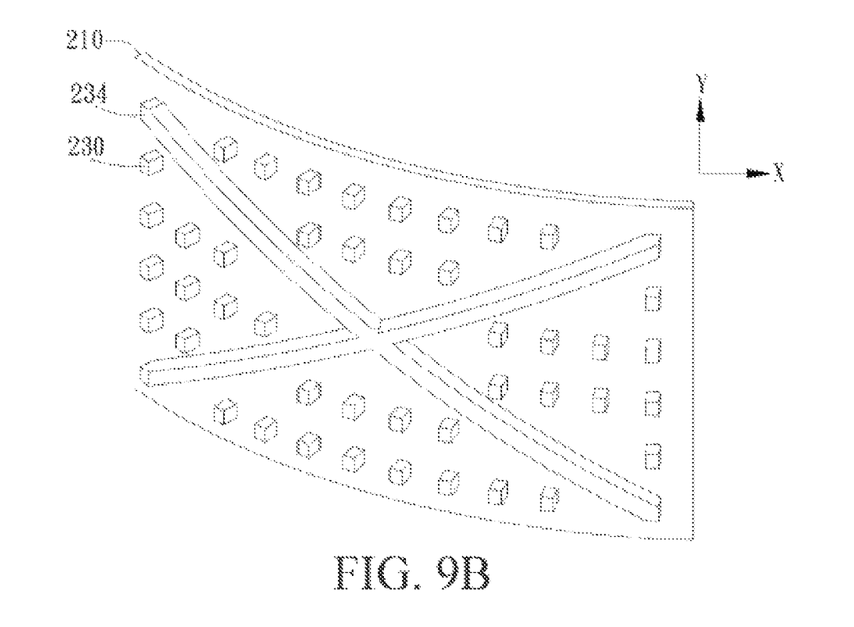

FIG. 9A and FIG. 9B are three-dimensional views of formation of spacer units and ribs on the curved back plate according to different embodiments. As shown in FIG. 9A, not only the spacer units 230 are formed on the first plate 210, but also a plurality of ribs 234 is formed on the first plate 210. The spacer units 230 are distributed on two sides of the ribs 234. The spacer units 230 and the ribs 234 are used in combination to improve the resistance of the curved back plate to bending deformation, thereby controlling the curvature. In the embodiment shown in FIG. 9A, the ribs 234 are distributed along the X direction. However, the distribution direction can be changed as required. As shown in FIG. 9B, the ribs 234 are distributed in directions that are oblique to the X direction and the Y direction, so as to counteract bending forces from different directions. It should be noted that the number of ribs 234 is not limited to that shown in the figure, but can be adjusted according to the size, material or other conditions of the curved back plate.

Based on the above, in the curved back plate of the present invention, a composite structure consisting of at least two layers of plates is used in combination with spacer units to maintain the height of the interlayer space between the plates, and the peripheries of the plates are fastened to each other, so as to improve the rigidity of the curved back plate, thereby avoiding the problem of poor structural stability caused when the display device becomes thinner.

Although the present invention has been described above through the foregoing embodiments, these embodiments are merely examples for implementing the present invention. It should be noted that the scope of the present invention is not limited to the disclosed embodiments. Any modifications and equivalent replacements encompassed by the spirit and scope of the claims shall fall within the scope of the present invention.

What is claimed is:

1. A curved back plate, comprising:
   a first plate, having a first periphery;
   a second plate, having a second periphery, wherein the second plate is disposed on the first plate, forming an interlayer space therebetween; and
   a plurality of spacer units, distributed in the interlayer space and connected to the first plate and the second plate,
   wherein the first periphery is fastened to the second periphery, the first plate and the second plate are curved corresponding to each other, the first plate is curved convexly with respect to the second plate and has a bending prestress, and the second plate is curved concavely with respect to the first plate.

2. The curved back plate according to claim 1, wherein the spacer units are a plurality of bumps extending from the first plate and protruding towards the second plate.

3. The curved back plate according to claim 2, wherein a top end of each of the bumps is fixedly connected to the second plate.

4. The curved back plate according to claim 1, wherein a distance between neighboring spacer units is not greater than 210 times a thickness of the first plate or the second plate.

5. The curved back plate according to claim 4, wherein the distance between neighboring spacer units is not greater than 210 times a thickness of a thinner one of the first plate and the second plate.

6. The curved back plate according to claim 5, wherein the interlayer space has a greater height at a center of the first plate than at the first periphery.

7. The curved back plate according to claim 5, wherein at least one rib is formed on the first plate, and the spacer units are distributed on two sides of the rib.

8. A curved display device, comprising:
   the curved back plate according to claim 5; and
   a curved display panel, disposed on an outer side of the first plate and supported by the first plate.

* * * * *